(No Model.)

J. S. PARDEE.
THILL COUPLING.

No. 382,828. Patented May 15, 1888.

WITNESSES:
Phil C. Dieterich
C. Sedgwick

INVENTOR:
J. S. Pardee
BY Munn & Co
ATTORNEYS.

UNITED STATES PATENT OFFICE.

JOEL S. PARDEE, OF NEW TROY, MICHIGAN.

THILL-COUPLING.

SPECIFICATION forming part of Letters Patent No. 382,828, dated May 15, 1888.

Application filed September 5, 1887. Serial No. 248,856. (No model.)

*To all whom it may concern:*

Be it known that I, JOEL S. PARDEE, of New Troy, in the county of Berrien and State of Michigan, have invented a new and Improved Pole and Thill Coupling, of which the following is a full, clear, and exact description.

My invention relates to pole and thill couplings, and has for its object to provide a simple, inexpensive, and effective coupling of this class, which may be almost instantly engaged with or disengaged from a stud on a vehicle thill or pole to allow either thills or a pole to be used in harnessing one or more horses to the vehicle. The coupling is also arranged to form an effective anti-rattler, doing away with all play of the thill-stud and promoting durability of all parts of the device.

The invention consists in certain novel features of construction and combinations of parts of the coupling, all as hereinafter described and claimed.

Reference is to be had to the accompanying drawings, forming a part of this specification, in which similar letters of reference indicate corresponding parts in all the figures.

Figure 1:
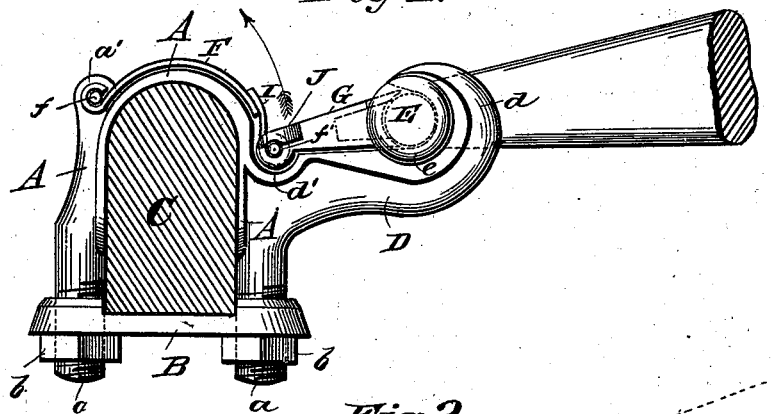
Figure 2:
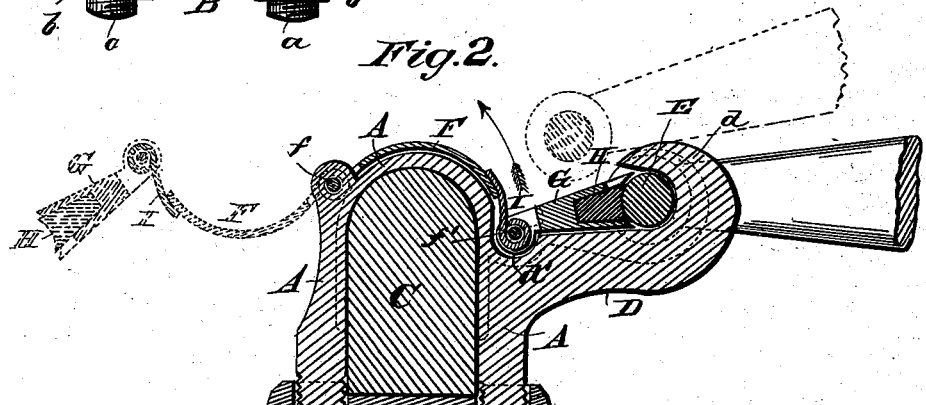
Figure 3:
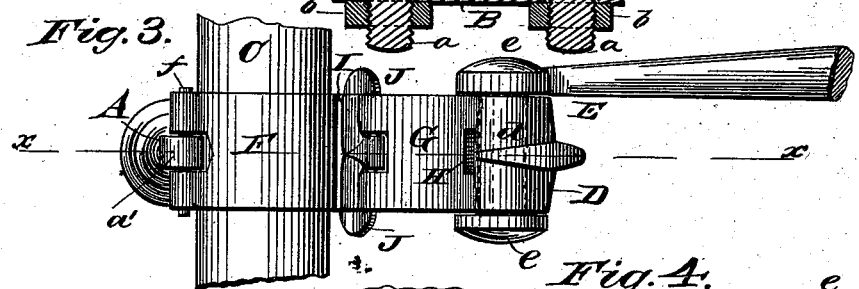
Figure 4:
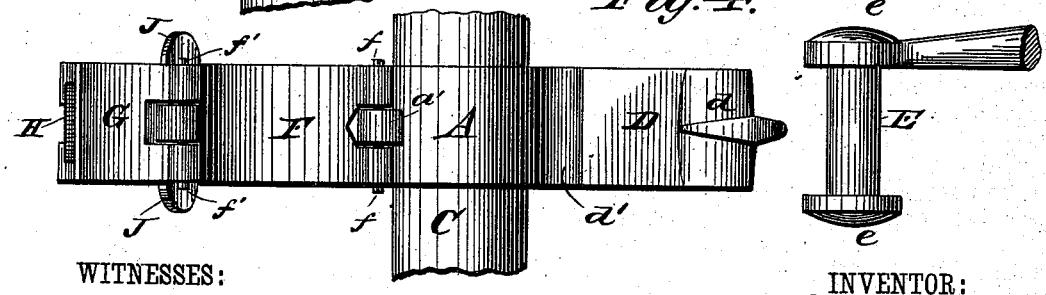

Figure 1 is a side elevation of my improved pole and thill coupling with the vehicle-axle shown in cross-section. Fig. 2 is a longitudinal section taken on the line $x$ $x$ of Fig. 3. Fig. 3 is a plan view, and Fig. 4 is a plan view with the parts thrown open and the thill or pole iron disconnected.

The coupling is made with a clip-iron, A, having bolt ends $a$ $a$, receiving nuts $b$ $b$, by which to confine a bottom plate, B, to clamp the clip-iron A securely to a vehicle axle, C. The above-named parts may have any usual or approved construction. At its front side the clip A is provided with a fixed forwardly-projecting hook, D, the bill $d$ of which is adapted to receive a bolt or lug, E, which is fixed to the back end of one of the thills or of the pole of a vehicle. The lug E has heads $e$ $e$ at opposite ends, which prevent its lateral displacement from the clip-hook. At its rear upper part the clip A is provided with a lug, $a'$, to which and the forked rear end of a curved plate-steel spring, F, a pin, $f$, is passed, to hinge the spring to the clip, and at its forward end this spring is hinged by a pin, $f'$, to the rear end of a metal clamp-head, $g$, which is provided with a longitudinally-ranging socket receiving a rubber or elastic block, H, adapted to bear onto the rear side of the stud E, fixed to the thill or pole, as the case may be. The hinged connection between the spring F and clamp-block G is made, preferably, by the use of a metal plate, I, which is riveted to the forward end of the spring, and is provided with a central lug which enters the forked rear end of the clamp-block G, to which it is connected by the pin $f'$. The rear end of the spring is formed with a couple of eyes which inclose the pin $f$.

At the point of junction of the hook D and clip A a recess or lateral groove, $d'$, is formed, to receive the knuckle at the hinge-joint of the parts F G, and between this recess $d'$ and the bill $d$ of the hook the upper face of the hook is about level, to form a solid support to the opposing flat face of the clamp-head G. A horizontal line drawn through the center of the pin $f$ will pass above the center of the thill or pole stud E, and a horizontal line drawn through the center of the pin $f'$ when the head G engages the stud is below the center of the stud.

At opposite sides the clamp-head G is provided, as near as may be to the pin $f'$, with a couple of lateral projections, J J, which may be grasped by the fingers for the purpose of fastening or unfastening the head to confine or free the stud E, as presently explained. The elastic block H normally projects beyond the end of its socket in the head G, to have a fair bearing on the stud E, and when the block H wears flush with said head it may be removed and a packing placed behind it, to give it when replaced the requisite projection for effective action upon the stud.

To couple the thills or pole to the vehicle-axle, it is only necessary to raise the spring F and clamp-head G to the position shown in dotted lines at the left of Fig. 2 of the drawings, slip the stud E into the bill $d$ of the hook D, swing the spring and clamp-head forward, so that the front end of the elastic block H bears against the rear surface of the stud E, and then press down the knuckle of the joint of the spring and clamp-head until said knuckle rests in the groove $d'$ at the junction of the hook and the clip, as shown in Figs. 1 and 3 of the drawings. The elastic block H thus acts to hold the stud E firmly in place in the hook D, preventing play of the stud in the hook or its slipping therefrom, and to hold the knuckle of the joint of the clamp-head and spring snugly in said groove $d'$, and the coupling of the thills or pole to the vehicle will be complete. The spring F only exerts itself sufficiently upon the joints at $f$ and $f'$ to keep the same from rattling, and allows also of the shortening of the relative positions of the spring and clamp-head incident to the opening and closing of their joint as said joint passes to or from the groove $d'$.

As a direct line between the stud E and pin $f$ is shorter than a line between these points touching the pin $f'$, and as the stud E is higher than the pin $f'$, it is manifest that back-pressure on the thill or pole stud can only press the spring F and the hinge-joint at $f'$ all the more closely to the front of the clip A, and press the knuckle of the joint harder into the lateral recess $d'$ at the butt of the hook, and as the point of the hook-bill overlies the end of the clamp-head the latter cannot rise and free itself from the hook.

It requires but a moment to lift on the lugs J and raise the parts F G and swing them over backward, when the thill or pole stud may be slipped backward from the hook to disconnect them, thus allowing either to be substituted for the other when it is desired to hitch one or two horses to the vehicle and without the annoyance and delay of unscrewing nuts or detaching other parts of the coupling, as will readily be understood.

Having thus fully described my invention, I claim as new and desire to secure by Letters Patent—

1. In a thill-coupling, the combination, with a clip adapted to a vehicle-axle, of a hook on the clip adapted to receive a thill or pole stud, and a clamp-head connected elastically and pivotally to the clip and adapted to lock against the thill or pole stud in the hook, substantially as described, for the purposes set forth.

2. In a thill-coupling, the combination, with a clip adapted to a vehicle-axle, of a hook on the clip, a spring pivoted to the clip, and a clamp-head pivoted to the spring and adapted to a thill or pole stud slipped into the hook, substantially as herein set forth.

3. In a thill-coupling, the combination, with a clip adapted to a vehicle-axle, of a hook, D $d$, on the clip, a spring, F, pivoted to the clip, and a clamp-head, G, pivoted to the spring and provided with an elastic block, H, adapted to bear on a thill or pole stud slipped into the hook, substantially as herein set forth.

4. In a thill-coupling, the combination, with a clip adapted to a vehicle-axle, of a hook, D $d$, on the clip, a spring, F, pivoted to the clip, and a clamp-head pivoted to the spring and adapted to a thill or pole stud slipped into the hook, and studs J at the joint between the spring and clamp-head, substantially as herein set forth.

5. In a thill-coupling, the combination, with a clip adapted to a vehicle-axle, of a hook, D $d$, on the clip, a spring, F, pivoted at $f$ to the clip, and a clamp-head pivoted at $f'$ to the spring and adapted to a thill or pole stud, E, slipped into the hook, and said pivot $f'$ being arranged below a line drawn through the centers of the stud E and pivot $f$ when the coupling is in use, substantially as herein set forth.

6. In a thill-coupling, the following elements in combination: a clip, A, a hook, D $d$, thereon, a spring, F, pivoted at $f$ to the clip, a clamp-head, G, pivoted to the spring at $f'$, and an elastic block, H, in the clamp-head and adapted to bear on a thill or pole stud, E, slipped into the hook, and said pivot $f'$ being arranged below a line drawn through the center of the stud E and pivot $f$ when the coupling is in use, substantially as herein set forth.

JOEL S. PARDEE.

Witnesses:
JENNIE B. PARDEE,
MARY E. BROWN.